United States Patent [19]

Kay et al.

[11] Patent Number: 4,559,378

[45] Date of Patent: Dec. 17, 1985

[54] STABILIZATION OF ELASTOMERS WITH ALIPHATIC-PHENYL DIAMINES AND ALIPHATIC PHOSPHITE COMPOUNDS

[75] Inventors: Edward L. Kay, Akron; Richard Gutierrez, Canal Fulton; Wendall R. Conard, Kent, all of Ohio

[73] Assignee: The Firestone Tire & Rubber Company, Akron, Ohio

[21] Appl. No.: 645,739

[22] Filed: Aug. 30, 1984

[51] Int. Cl.$^4$ .................................................. C08K 5/52
[52] U.S. Cl. ...................................... 524/147; 524/255; 528/930
[58] Field of Search ............... 524/151, 147, 254, 255, 524/575.5, 925, 926, 927; 528/930

[56] References Cited

U.S. PATENT DOCUMENTS

| | | | |
|---|---|---|---|
| 1,753,184 | 4/1930 | Spence | 524/255 |
| 1,753,185 | 4/1930 | Spence | 524/255 |
| 2,419,354 | 4/1947 | Howland et al. | 524/151 |
| 2,733,226 | 1/1956 | Hunter | 524/151 |
| 3,080,338 | 3/1963 | Nudenberg et al. | 524/151 |
| 3,822,225 | 7/1974 | Braddon et al. | 524/925 |
| 3,839,275 | 10/1974 | Wilder | 524/255 |
| 3,969,315 | 7/1976 | Beadle | 524/254 |
| 4,405,532 | 9/1983 | Gutierrez et al. | 528/930 |
| 4,435,337 | 3/1984 | Kay et al. | 528/930 |

OTHER PUBLICATIONS

Campos-Lopez, E. et al.-Guayule Reencuentro en el Desierta, 375–410, Int'l Conf. on Guayule (2nd: 1977).
Winkler, D. S. et al.-ibid, 265–280.
A. S. Zuziminskii et al.: The Ageing and Stabilization of Polymers-Elsevier Pub. Co. 1971, 128–161 (Piotrovskii) and 210–242 (Kirpichnikov et al.).
Article "Guayule, An Alternate Source of Natural Rubber;" National Academy of Sciences, Washington, D.C. (1977).
Keller, Winkler & Stevens: Paper No. 55, "Degradative Effects of Guayule on Natural Rubber," presented at 117th Meeting of Rubber Division, ACS, Las Vegas, Nev., May 1980; Rubber Chemistry & Technology 54, 115–123.
Gonzales: Paper No. 2, 116th Meeting of Rubber Division, ACS, Cleveland, Ohio, Oct. 23–26, 1979.
R. T. Vanderbilt Company, Inc. advertises Butyl Zimate, May 11, 1981, appearing in C & EN.
Baldemar Motomochi et al., "Mechanical Drying of Guayule and Hevea: A Pilot Plant Study", presented at 3rd International Guayule Conference, Guayule Pasadena, Calif., Apr. 30, 1980.
"Vulcanization of Guayule Rubber", Paper No. 19, Ramos et al., presented at 116th Meeting, Rubber Division, ACS, Oct. 23–26, 1978, Cleveland, Ohio.
"Review of Unsolved Problems in the Protection of Rubber Against Oxidative Degradation", Rubber Chemistry and Technology, 47, 960 (1974).
Howard: Rubber Chemistry and Technology, 47, 976 (1974).

*Primary Examiner*—Veronica P. Hoke
*Attorney, Agent, or Firm*—Daniel N. Hall

[57] ABSTRACT

Elastomers such as guayule rubber is stabilized by the addition of an alkyl, cycloalkyl or alkyl substituted cycloalkyl phenyl-phenylenediamine compound with an alkyl, cycloalkyl or alkyl substituted cycloalkyl phosphite compound which, in combination, yield an unexpectant and synergistic result.

12 Claims, No Drawings

STABILIZATION OF ELASTOMERS WITH ALIPHATIC-PHENYL DIAMINES AND ALIPHATIC PHOSPHITE COMPOUNDS

TECHNICAL FIELD

The present invention relates to stabilization of elastomers, especially guayule rubber, through the combination of two types of compounds, namely an aliphatic phenyl-phenylenediamine along with an aliphatic phosphite compound.

BACKGROUND ART

Guayule rubber can be recovered from the guayule shrub Parthenium Argentatum which grows in semiarid regions. There has been a renewed interest in the commercialization of guayule rubber to supplement natural rubber obtained from the rubber tree Hevea brasiliensis. Both guayule and Hevea are considered "natural rubber."

Unlike Hevea, guayule rubber does not contain natural antioxidants and must be stabilized to prevent rapid degradation upon contact with air (Guayule, An Alternate Source of Natural Rubber; National Academy of Science; Washington D.C. 1977; page 25). An antioxidant to stabilize guayule rubber is usually added during the solution phase purification of the crude guayule rubber (ibid, p. 36). Since guayule and Hevea rubbers have chemical and physical properties that are virtually identical (ibid, p. 3), it is reasonable to expect that conventional antioxidants for rubber (specifically, cis-1,4-polyisoprene) would be adequate for the stabilization of guayule rubber. However, Keller, Winkler and Stevens (Paper No. 55, "Degradative Effects of Guayule Resin on Natural Rubber," presented at the 117th Meeting of the Rubber Division, ACS; Las Vegas, Nev., May 1980, determined that linoleic acid, which is a component of guayule resin (which in turn is a potential contaminant of guayule rubber) has an adverse effect on the stability of guayule rubber. Therefore, from a practical standpoint, a stabilizer additive(s) for guayule rubber preferably will function to prevent the deleterious effects of heat and oxygen (air) on the rubber itself (cis-1,4-structure) as well as the possible adverse effects of certain components of guayule resin.

There are many chemical compounds which have been shown to be effective antioxidants for elastomers. For example, Dunn in his article, "Review of Unsolved Problems in the Protection of Rubber Against Oxidative Degradation," Rubber Chemistry and Technology, 47 960 (1974); pointed out that there were over three thousand patents issued in a ten year period on the protection of polymers against aging. Dunn also pointed out that because of "antagonism," an antioxidant which proves highly effective in one rubber can be totally ineffective in another. Howard [Rubber Chemistry and Technology 47 976 (1974)] discussed antioxidant synergism.

The following references disclose the use of specific compounds as stabilizers for guayule rubber.

Gonzales (Paper No. 2, 116th Meeting of the Rubber Division, ACS, Cleveland, Ohio, Oct. 23–26, 1979) reported the results of stabilization of guayule rubber with phenolic compounds (thio-, methylene coupled as well as alkylated) and N,N'-diphenyl-p-phenylenediamine. The synergistic results of our invention is not suggested by Gonzales.

Butyl Zimate ® which is a product of R. T. Vanderbilt Co., Inc. and chemically identified as the zinc salt of di-n-butyldithiocarbamic acid has been advertized as an excellent stabilizer for guayule rubber (Chemical & Engineering News, May 11, 1981).

The C & EN May 11, 1981 advertisement also disclosed that Butyl Zimate ® alone or with Agerite ® Geltrol ® is the optimum stabilizer for Kraton ® 1107 - based hot melts. Agerite ® Geltrol ® is also a product of R. T. Vanderbilt and is identified chemically (Rubber World; Materials and Compounding Ingredients for Rubber, 1968 Edition, page 97) as a modified high molecular weight hindered phenol. Hindered phenols are not included in the synergistic combination of the present invention.

A somewhat more specific identification of Agerite ® and Geltrol ® is an alkylated-arylated bisphenolic phosphite (The Vanderbilt Handbook, page 388).

Baldemar Motomochi B, Pasquale G. Galioto and Hans R. Strop disclosed in their publication entitled, "Mechanical Drying of Guayule and Hevea: A Pilot Plant Study) a paper presented at 3rd International Guayule Conference, Pasadena, Calif., Apr. 30, 1980). the use of 50 percent Butyl Zimate/50 percent AgeRite Superlite ® at a 1 percent loading in guayule rubber as a stabilizer system. AgeRite Superlite ® was identified as a polybutylated Bisphenol A which is a phenolic compound and no mention of synergism was made.

"BHT" which is butylated hydroxy toluene was disclosed and the antioxidant used to stabilize guayule rubber in the Saltillo, Mexico pilot plant (Paper No. 19, "Vulcanization of Guayule Rubber;" L. F. Ramos and B. Motomochi presented at the 116th meeting of the Rubber Division, ACS, Oct. 23–36, 1978 in Cleveland, Ohio.

U.S. Pat. Nos. 1,753,184 and 1,753,185 relate to the use of dimethyl-para-phenylenediamine as a stabilizing agent for guayule rubber. However, these patents fail to suggest the utilization of a second stabilizing compound or any synergistic result obtained thereby.

No reference relating to the use of a positive synergistic combination of para-phenylenediamines with organic phosphites for the stabilization of elastomers such as guayule rubber has been found.

DISCLOSURE OF INVENTION

It is therefore an aspect of the present invention to provide stabilizing compounds for elastomers which yield a synergistic result.

It is yet another aspect of the present invention to provide synergistic stabilizers wherein one of said stabilizers is an aliphatic-phenylphenylenediamine and the other stabilizer is an aliphatic-phosphite.

It is yet another aspect of the present invention to provide stabilization of guayule rubber to a degree which would allow the guayule rubber to be stored for a reasonable length of time.

These and other aspects of the present invention will become apparent from the following specification which describes in detail the present invention.

In general, a stabilized elastomer, comprises: approximately 100 parts by weight of the elastomer; and from about 0.05 to about 1.0 parts by weight of a compound having the formula:

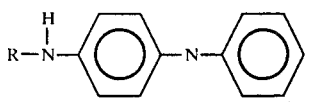

wherein R is an alkyl having from 1 to 12 carbon atoms, a cycloalkyl or an alkyl substituted cycloalkyl having from 5 to 12 carbon atoms, and combinations thereof; and from about 0.05 to about 1.0 parts by weight of a phosphite having the formula

where R' is an alkyl having from 1 to 12 carbon atoms, a cycloalkyl or an alkyl substituted cycloalkyl having from 5 to 12 carbon atoms, and combinations thereof.

BEST MODE FOR CARRYING OUT THE INVENTION

Generally, elastomers can be stabilized utilizing the two types of compounds of the present invention. Examples of such elastomers include styrene-butadiene rubber, nitrile rubber, butyl rubber, a random copolymer of ethylene-propylene, a block copolymer of ethylene-propylene, EPDM, that is a terpolymer of ethylene-propylene and a diene, for example norbornene, neoprene, polybutadiene, and especially guayule rubber. With regard to the synthetic elastomers, they can be obtained from conventional sources as well known to the art.

Considering guayule rubber, it is utilized as attained in any conventional manner. Typically, the whole guayule plant can be crushed or ground to a small particle size, for example about ⅛ inch length. A hammer mill is commonly utilized. The ground shrub can then be slurried in water and further ground to release the rubber as described in reference, see page 1. This process is generally referred to as the "Water Flotation Process." Alternatively, the crushed particles can be treated with a nonpolar, hydrocarbon solvent to extract the rubber therefrom. Typical solvents include the alkanes having from 4 to 9 carbon atoms, for example butanes, pentanes, and hexanes, with hexane being preferred. Other suitable solvents include the various cycloalkanes having from 5 to 10 carbon atoms such as cyclohexane. The aromatics or alkyl substituted aromatics having from 6 to 12 carbon atoms, as for example, benzene, toluene, etc., can also be utilized.

Since guayule rubber has poor stability, it must be stabilized with various compounds. The two types of compounds of the present invention have been found to impart a good degree of stability and is truly a synergistic stability in that the total improvement is much greater than the additives' stability of each separate compound.

The first type of compound is a phenylenediamine compound having the formula

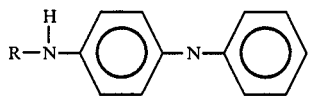

where R is an alkyl having 1 to 12 carbon atoms, with 1 to 8 carbon atoms being desired. The preferred alkyl group is hexyl and preferably the dimethylbutyl isomer thereof. R can also be a cycloalkyl or an alkyl substituted cycloalkyl having from 5 to 12 carbon atoms with from 6 to 10 carbon atoms being preferred. Representative examples of such compounds include N-isopropyl-N'-phenyl-p-phenylenediamine, N-cyclohexyl-N-phenyl-p-phenylenediamine, with N-(1,3-dimethylbutyl)-N'-phenyl-p-phenylenediamine being preferred.

The second type of compound is a phosphite compound having the formula

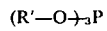

where R' is an alkyl having from 1 to 12 carbon atoms, desirably having from 4 to 10 carbon atoms, with octyl or specifically isooctyl being preferred. R' can also be a cycloalkyl or an alkyl substituted cycloalkyl having from 5 to 12 carbon atoms, with from 6 to 8 carbon atoms being preferred.

The amount of the phenylenediamine compound as well as the phosphite compound is generally from about 0.05 to about 1.0 parts by weight and preferably from about 0.1 to about 0.5 parts by weight based upon 100 parts by weight of the elastomer. The ratio of the phenylenediamine compound to the phosphite compound, based upon weight, is generally from about 10 to about 0.1, and desirably from about 5 to about 0.5. Preferably, an approximate one-to-one weight ratio is utilized.

The phenylenediamine type stabilizer and the phosphite type stabilizer can be mixed or blended with the elastomer, as for example guayule rubber, until generally a random distribution is obtained in accordance with any conventional manner. For example, they can be added either sequentially or simultaneously to the rubber in any common mixing apparatus such as a Banbury, two mill roll, or the like. Often times, a two roll mill is utilized at ambient temperature or which is heated to a temperature of from about 25° to about 75° C.

The stabilized guayule rubber of the present invention can generally be utilized in any situation wherein guayule rubber is utilized. Accordingly, it can be utilized in making a great number of rubber products such as conveyor belts, shoe soles, tires, especially aircraft tires, tank pads, and the like. Moreover, the elastomer can contain various conventional additives such as accelerators, fillers, curing agents, and the like.

The following examples illustrate the synergistic result obtained with regard to stabilization. By stabilization, it is meant that guayule rubber functions in an evaluation test similar to commercially acceptable Hevea rubber.

To evaluate the thermooxidative stability of the rubber containing the synergistic stabilizer combinations of the invention, the Wallace Plastimeter was used. Experimental results obtained with this instrument are generally accepted by those skilled in the art as relatively accuarate evaluation of the thermooxidative stability of Hevea natural rubber.

ASTM D3194-73 procedure was followed in our initial experimental work (1980 Annual ASTM Standards; Rubber, Natural and Synthetic-General; part 37, page 712). However, in order to differentiate between very effective positive synergistic stabilizer combinations of the present invention, we modified the ASTM D3194-73 procedure by aging single samples (rather than three samples) at 140° C. for the designated 30 minutes, as well as 60, 90 and 120 minutes to increase the severity of the test. By the modified procedure, it developed trends of oxidative stability under rather severe aging conditions. It should be stated that if the experimental data summarized in the following tables contain only a Po and PRI value for 30 minutes of aging, the ASTM D3194-73 test procedure was followed. If Po and PRI values given for 30, 60, 90 and 120 minutes are recorded, the modified ASTM procedure was followed. It is emphasized that the ASTM procedure was modified in the sense that one, rather than three, samples were used and the time of forced-air aging at 140° C. was extended from 30 to 120 minutes. Sample preparation and actual testing in the Wallace Plastimeter were the same as designated in the ASTM D3194-73 procedure.

For the sake of complete disclosure, Po is the plasticity value on the unaged rubber sample, PA the plasticity value on the sample aged for the designated time and PRI (Plasticity Retention Index) is the ratio of aged plasticity/unaged plasticity expressed as a percent; (Po/PA)100 =PRI.

EXAMPLE 1

Three stocks of guayule rubber were used (designated 1, 2 and 3 in Table I). The guayule rubber was recovered by the "water flotation process." As will be discussed later, the three stocks of guayule rubber gave essentially equivalent test results and were used in both Examples 1 and 2.

TABLE I
STABILITY OF REFERENCE ELASTOMERS

| Rubber Sample | Po | Wallace Plastimeter Data | | | | | | | |
|---|---|---|---|---|---|---|---|---|---|
| | | Pa After Minutes | | | | PRI After Minutes | | | |
| | | 30 | 60 | 90 | 120 | 30 | 60 | 90 | 120 |
| Guayule | | | | | | | | | |
| No. 1 | 42 | 2 | — | — | — | 5 | — | — | — |
| No. 2 | 43 | 2 | — | — | — | 5 | — | — | — |
| No. 3 | 45 | 3 | 0 | 0 | 0 | 7 | 0 | 0 | 0 |
| Hevea | 45 | 19 | — | — | — | 42 | — | — | — |
| Hevea | 48 | 20 | 9 | 7 | 4 | 42 | 19 | 15 | 8 |

EXAMPLE 2

The same stock material was utilized in Example 2 as for Example 1, with the exception that the listed additives were added on a two roll mill, with the mill being at ambient temperature and mixed until the additives were well dispersed.

TABLE II
POSITIVE SYNERGISTIC ADDITIVE COMBINATION A & B

| Guayule Rubber; phr Additive | | | Wallace Plastimeter Data | | | | | | | |
|---|---|---|---|---|---|---|---|---|---|---|
| A | B | Po | Pa After Minutes | | | | PRI After Minutes | | | |
| | | | 30 | 60 | 90 | 120 | 30 | 60 | 90 | 120 |
| 1.00 | — | 43 | 28 | 22 | 19 | 24 | 65 | 51 | 44 | 56 |
| 0.50 | — | 43 | 25 | — | — | — | 58 | — | — | — |
| 0.50 | — | 43 | 20 | 18 | 15 | 10 | 47 | 42 | 35 | 23 |
| 0.25 | — | 45 | 25 | — | — | — | 55 | — | — | — |
| 0.25 | — | 44 | 17 | 14 | 12 | 9 | 39 | 32 | 27 | 20 |
| — | 0.50 | 41 | 11 | 6 | 0 | 0 | 27 | 15 | 0 | 0 |
| — | 0.25 | 41 | 3 | 0 | 0 | 0 | 7 | 0 | 0 | 0 |
| 0.25 | 0.25 | 41 | 34 | 29 | 17 | 13 | 83 | 71 | 41 | 32 |
| 0.25 | 0.25 | 43 | 39 | — | — | — | 91 | — | — | — |

Data on unstabilized guayule rubber as well as Hevea rubber are summarized in Table I. Results on the Hevea sample are included as a reference point. That is, the Hevea sample is representative of a commercial product, the thermooxidative stability of which is adequate for long term storage of the rubber as well as adequate to prevent undue degradation during mixing of the rubber with compounding ingredients prior to vulcanization to finished rubber products.

Referring to Table I, results on three samples of unstabilized guayule rubber are recorded. The Po values on these samples range from 42 to 45 as compared to 45 and 48 Po values obtained on the Hevea rubber sample. These results are indicative that the bulk viscosities of guayule and Hevea rubbers are similar.

Referring to the 30 minute PA values, it is readily apparent that the PA value of 2 to 3 obtained on the guayule rubber sample are significantly lower than the 19 and 20 PA results on Hevea. The results demonstrate that the guayule rubber samples are not adequately stabilized. Samples of these unstabilized quayule rubber stocks were used in our subsequent investigation. That is, selected additives were added to the unstabilized guayule rubber samples and the resulting mixture evaluated in the Wallace Plastimeter to determine the effects of the additive relative to stabilization of the Guayule rubber.

It should be noted that the PA values on the guayule rubber samples after further forced-air oven treatment were essentially zero (too low to measure accurately). In contrast, the PA values of the Hevea sample gradually decreased from 20 after 30 minutes to 4 after 120 minutes. Since Hevea rubber performs very well in industrial applications, Wallace Plastimeter data on experimental stabilized guayule rubber samples greater than the results obtained on Hevea would indicate that the thermooxidative stability of the guayule rubber sample would be adequate for commercial use.

Wallace Plastimeter data on guayule rubber containing the positive synergistic additive combinations of our invention are summarized in Table II.

For the sake of brevity in our specification, the commercially available N-(1,2-dimethylbutyl)N'-phenyl-p-phenylenediamine is designated additive "A" and the tris(isooctyl) phosphite is designated additive "B". Guayule rubber containing additive "A" is in accord with expected results; additive "A" functions as an effective stabilizer; and, as the concentration of additive "A" is decreased, the thermooxidative stability of the experimental samples is decreased.

As indicated by the PA and PRI values on the samples containing additive "B" only, additive "B" is not a particularly effective stabilizer for guayule rubber. However, the combination of 0.25 phr of additive "A" and 0.25 phr additive "B" does impart good thermooxidative stability to guayule rubber. Actually, the results on the sample containing 0.25 phr each of the additives "A" and "B" are considered better than the 30 and 60 minute results obtained on the sample containing either 1.0 phr additive "A" or 0.50 phr additive "B".

As apparent from the utilization of both additives "A" and "B," the overall values are considerably higher than the additive effect of "A" plus "B," thus clearly indicating a synergistic result.

While in accordance with the patent statutes, a preferred embodiment and best mode has been described in detail, the scope of the present invention is measured by the scope of the attached claims.

What is claimed is:
1. A stabilized guayule rubber, comprising:
   approximately 100 parts by weight of the elastomer; and from about 0.05 to about 1.0 parts by weight of a compound having the formula:

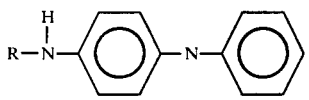

wherein R is an alkyl having from 1 to 12 carbon atoms, a cycloalkyl or an alkyl substituted cycloalkyl having from 5 to 12 carbon atoms, and combinations thereof; and from about 0.05 to about 1.0 parts by weight of a phosphite having the formula

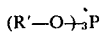

where R' is an alkyl having from 1 to 12 carbon atoms, a cycloalkyl or an alkyl substituted cycloalkyl having from 5 to 12 carbon atoms, and combinations thereof.

2. A stabilized guayule rubber according to claim 1, wherein the weight ratio of said phenylenediamine to said phosphite compound is from about 10 to about 0.1.

3. A stabilized guayule rubber according to claim 2, wherein R of said phenylenediamine compound is an alkyl having from 1 to 8 carbon atoms, a cycloalkyl or an alkyl substituted cycloalkyl having from 6 to 10 carbon atoms, and wherein said R' of said phosphite compound is an alkyl having from 4 to 10 carbon atoms, a cycloalkyl or an alkyl substituted cycloalkyl having from 5 to 12 carbon atoms.

4. A stabilized guayule rubber according to claim 3, wherein the amount of said phenylenediamine compound, as well as the amount of said phosphite compound is from about 0.1 to about 0.5 parts by weight.

5. A stabilized guayule rubber according to claim 4, wherein said weight ratio of said phenylenediamine compound to said phosphite compound is from about 5 to about 0.5.

6. A stabilized guayule rubber according to claim 5, wherein said phenylenediamine compound is N-(1,3-dimethylbutyl)-N'-phenyl-p-phenylenediamine, and wherein said phosphite compound is tris(isooctyl)-phosphite.

7. A stabilized guayule rubber according to claim 3, wherein said weight ratio of said phenylenediamine compound to said phosphite compound is from about 5 to about 0.5.

8. A stabilized guayule rubber according to claim 7, wherein said phenylenediamine compound is N-(1,3-dimethylbutyl)-N'-phenyl-p-phenylenediamine, and wherein said phosphite compound is tris(isooctyl)-phosphite.

9. A stabilized guayule rubber according to claim 1, wherein said elastomer is cured.

10. A stabilized guayule rubber according to claim 2, wherein said elastomer is cured.

11. A stabilized elastomer according to claim 4, wherein said elastomer is cured.

12. A stabilized guayule rubber according to claim 8, wherein said elastomer is cured.

* * * * *